United States Patent
Li et al.

(10) Patent No.: US 8,730,900 B2
(45) Date of Patent: May 20, 2014

(54) METHOD AND DEVICE FOR ADAPTIVE ADJUSTING UPLINK AND DOWNLINK BANDWIDTH

(75) Inventors: Yan Li, Shenzhen (CN); Aihua Peng, Shenzhen (CN); Nan Zhao, Shenzhen (CN); Feng Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 18 days.

(21) Appl. No.: 13/583,005

(22) PCT Filed: Nov. 4, 2010

(86) PCT No.: PCT/CN2010/078412
§ 371 (c)(1),
(2), (4) Date: Sep. 6, 2012

(87) PCT Pub. No.: WO2012/000266
PCT Pub. Date: Jan. 5, 2012

(65) Prior Publication Data
US 2013/0121268 A1    May 16, 2013

(30) Foreign Application Priority Data
Jun. 28, 2010 (CN) .......................... 2010 1 0220682

(51) Int. Cl.
*H04W 4/00* (2009.01)

(52) U.S. Cl.
USPC ........... 370/329; 370/328; 370/310; 370/322; 455/450; 455/464; 455/509

(58) Field of Classification Search
CPC .............................. H04W 72/04; H04L 12/56
See application file for complete search history.

(56) References Cited

U.S. PATENT DOCUMENTS

2009/0201838 A1    8/2009  Zhang et al.

FOREIGN PATENT DOCUMENTS

| CN | 101166182 A | 4/2008 |
|---|---|---|
| CN | 101212765 A | 7/2008 |

OTHER PUBLICATIONS

International Search Report for PCT/CN2010/078412 dated Mar. 8, 2011.

*Primary Examiner* — Anez Ebrahim
(74) *Attorney, Agent, or Firm* — Ling Wu; Stephen Yang; Ling and Yang Intellectual Property (57) ABSTRACT

The present invention discloses a method for adaptively adjusting uplink and downlink bandwidth, which includes: a base station counting a usage status of the uplink and downlink bandwidth in a preset time, and obtaining a bandwidth amount $\Delta BW_{DL}$ required to be coordinated of downlink bandwidth and a bandwidth amount $\Delta BW_{UL}$ required to be coordinated of uplink bandwidth; the base station determining a direction, amount and location of the required change of the uplink and downlink bandwidth according to the obtained $\Delta BW_{DL}$ and $\Delta BW_{UL}$; the base station carrying the determined direction, amount and location of the required change of the uplink and downlink bandwidth through residual ten bits in a logical channel message corresponding to a Physical Broadcast Channel (PBCH) and informing a terminal of the direction, amount and location. The present invention also discloses a device for adaptively adjusting the uplink and downlink bandwidth.

14 Claims, 4 Drawing Sheets

| (b, c) | Number of Resource Blocks (RB) |
|---|---|
| 00 | 10 |
| 01 | 25 |
| 10 | 50 |
| 11 | 75 |

METHOD AND DEVICE FOR ADAPTIVE ADJUSTING UPLINK AND DOWNLINK BANDWIDTH

TECHNICAL FIELD

The present invention relates to bandwidth allocation technology in radio communication system, and particularly, to a method and device for adaptively adjusting uplink and downlink bandwidth.

BACKGROUND OF THE RELATED ART

Spectrum resources are basic medium of communications, but the spectrum resources are limited, which makes users hope that utilization rate of frequency spectrum can be improved furthest. The development of different radio access technologies is also to improve the utilization rate of frequency spectrum. However, the frequency spectrum and load switching between radio access technologies in the existing communication network are almost nonexistent, that is, almost no cooperative operations are existent between each other, which causes that usage of the frequency spectrum is relatively solidified and not flexible enough, and reduces the utilization rate of frequency spectrum. For example, frequency spectrum load of some radio access technologies are relatively light, but frequency spectrum load of some radio access technologies are relatively heavy, since there are no interaction and cooperation between the access technologies, flexible dynamic allocation of frequency spectrum can be not implemented. In order to solve this problem, the industry study the radio cognitive technology currently to implement dynamic adjustments of network through cognitive radio, which includes the adjustments of working parameters such as the radio access technology and frequency band in one region. However, the ultimate goal of the cognitive radio is to require that access can be implemented on different frequency bands with different radio access technologies and communications can be performed; it has very high requirements on the base station and terminal, even new network elements may be added in the existing network structure, and the technology is still at the study phase and has no complete achievable schemes currently.

In radio communication, an uplink service and a downlink service are generally asymmetric, and in normal conditions, downlink service traffic is greater than uplink service traffic. Therefore, in certain conditions (especially in a condition of symmetric uplink and downlink bandwidth), relatively surplus uplink system bandwidth and tensive downlink system bandwidth will occur. Specifically, in a Long Term Evolution Frequency Division Duplex (LTE FDD) system, the uplink bandwidth and downlink bandwidth are usually configured symmetrically, that is, the uplink bandwidth and downlink bandwidth are identical, which may cause idle uplink system bandwidth and then lead to a decreasing utilization rate of frequency spectrum, but the downlink frequency band are insufficient and has no frequency spectrum supplement. Similarly, in a few conditions, when uplink traffic is relatively heavy, insufficient uplink bandwidth will be caused, and if there is idle bandwidth in downlink, it will cause the utilization rate of downlink frequency spectrum to reduce in a fixedly configured network.

It can be seen that, adopting a fixed network configuration in the above scenarios can not optimize the use of frequency spectrum. In addition, the cognitive radio technology is still at the study phase and also does not consider a bandwidth coordination scenario with such kind of radio access technology. Therefore, utilization efficiency of frequency spectrum in the LTE FDD system needs to be further improved.

SUMMARY OF THE INVENTION

In view of this, the main object of the present invention is to provide a method and device for adaptively adjusting uplink and downlink bandwidth, to improve utilization efficiency of frequency spectrum in an LTE FDD system.

In order to achieve the foregoing objects, the technical scheme of the present invention is implemented as follows.

The present invention provides a method for adaptively adjusting uplink and downlink bandwidth, which comprises:

a base station counting a usage status of the uplink and downlink bandwidth in a preset time, and obtaining a bandwidth amount $\Delta BW_{DL}$ required to be coordinated of downlink bandwidth and a bandwidth amount $\Delta BW_{UL}$ required to be coordinated of uplink bandwidth;

the base station determining a direction, amount and location of the required change of the uplink and downlink bandwidth according to the obtained $\Delta BW_{DL}$ and $\Delta BW_{UL}$;

the base station carrying the determined direction, amount and location of the required change of the uplink and downlink bandwidth through residual ten bits in a logical channel message corresponding to a Physical Broadcast Channel (PBCH) and informing a terminal of the direction, amount and location.

The base station determining the direction, amount and location of the required change of the uplink and downlink bandwidth according to the obtained $\Delta BW_{DL}$ and $\Delta BW_{UL}$ is specifically:

when $\Delta BW_{DL}$ is less than 0, $\Delta BW_{UL}$ is greater than 0, an absolute value of $\Delta BW_{DL}$ is less than or equal to an absolute value of $\Delta BW_{UL}$, and the absolute value of $\Delta BW_{DL}$ is greater than or equal to a certain element in a preset RB number set, the base station selecting a maximum value less than the absolute value of $\Delta BW_{DL}$ from the RB number set as coordination bandwidth to allocate to the downlink bandwidth;

when $\Delta BW_{UL}$ is less man 0, $\Delta BW_{DL}$ is greater than 0, the absolute value of $\Delta BW_{UL}$ is less than or equal to the absolute value of $\Delta BW_{DL}$, and the absolute value of $\Delta BW_{UL}$ is greater than or equal to a certain element in the preset RB number set, the base station selecting the maximum value less than the absolute value of $\Delta BW_{UL}$ from the RB number set as the coordination bandwidth to allocate to the uplink bandwidth.

After the base station counting the usage status of the uplink and downlink bandwidth in the preset time, the method further comprises: the base station determining the preset RB number set according to an uplink default bandwidth configuration and a downlink default bandwidth configuration.

The method further comprises:

carrying identity information indicating that the coordination bandwidth is downlink borrowing or uplink borrowing, amount of borrowing bandwidth and location of borrowing bandwidth in the residual ten bits in the logical channel message corresponding to the PBCH;

or, carrying the identity information indicating that the coordination bandwidth is downlink borrowing or uplink borrowing and the amount of borrowing bandwidth in the residual ten bits in the logical channel message corresponding to the PBCH; wherein, the location of borrowing bandwidth is pre-configured.

After the base station sends the logical channel message corresponding to the PBCH to the terminal, the method further comprises:

the terminal obtaining the direction, amount and location of the required change of the uplink and downlink bandwidth by parsing the logical channel message, and re-coordinating the uplink and downlink bandwidth based on this.

The present invention further provides a device for adaptively adjusting uplink and downlink bandwidth, which comprises:

a bandwidth counting module, configured to: count a usage status of the uplink and downlink bandwidth in a preset time, and obtain a bandwidth amount $\Delta BW_{DL}$ required to be coordinated of downlink bandwidth and a bandwidth amount $\Delta BW_{UL}$ required to be coordinated of uplink bandwidth;

a bandwidth coordination and allocation module, configured to: determine a direction, amount and location of the required change of the uplink and downlink bandwidth according to the obtained $\Delta BW_{DL}$ and $\Delta BW_{UL}$;

a sending module, configured to: carry the determined direction, amount and location of the required change of the uplink and downlink bandwidth through residual ten bits in a logical channel message corresponding to a PBCH and inform a terminal of the direction, amount and location.

The bandwidth coordination and allocation module is further configured to: when $\Delta BW_{DL}$ is less than 0, $\Delta BW_{UL}$ is greater than 0, an absolute value of $\Delta BW_{DL}$ is less than or equal to an absolute value of $\Delta BW_{UL}$, and the absolute value of $\Delta BW_{DL}$ is greater than or equal to a certain element in a preset RB number set, select a maximum value less than the absolute value of $\Delta BW_{DL}$ from the RB number set as coordination bandwidth to allocate to the downlink bandwidth; when $\Delta BW_{UL}$ is less than 0, $\Delta BW_{DL}$ is greater than 0, the absolute value of $\Delta BW_{UL}$ is less than or equal to the absolute value of $\Delta BW_{DL}$, and the absolute value of $\Delta BW_{UL}$ is greater than or equal to a certain element in the preset RB number set, select the maximum value less than the absolute value of $\Delta BW_{UL}$ from the RB number set as the coordination bandwidth to allocate to the uplink bandwidth.

The device further comprises: a set determination module, configured to: after the usage status of the uplink and downlink bandwidth in the preset time is counted, determine the preset RB number set according to an uplink default bandwidth configuration and a downlink default bandwidth configuration.

Identity information indicating that the coordination bandwidth is downlink borrowing or uplink borrowing, amount of borrowing bandwidth and location of borrowing bandwidth are carried in the residual ten bits in the logical channel message corresponding to the PBCH;

or, the identity information indicating that the coordination bandwidth is downlink borrowing or uplink borrowing and the amount of borrowing bandwidth are carried in the residual ten bits in the logical channel message corresponding to the PBCH; and the location of borrowing bandwidth is pre-configured.

After receiving the logical channel message, the terminal obtains the direction, amount and location of the required change of the uplink and downlink bandwidth by parsing the logical channel message, and re-coordinates the uplink and downlink bandwidth based on this. With the method and device for adaptively adjusting uplink and downlink bandwidth provided by the present invention, dynamic coordination and allocation of the uplink and downlink bandwidth in the LTE FDD system is solved, and utilization efficiency of frequency spectrum is improved. The implementation complexity of the present invention is lower, modification to the base station and terminal is smaller relative to cognitive radio technology, and a network structure will not be modified; there is a good compatibility to LTE Release8 users through Radio Resource Control (RRC) layer configuration; and Medium Access Control (MAC) layer scheduling can avoid the interference between the uplink and downlink.

PREFERRED EMBODIMENTS OF THE PRESENT INVENTION

The technical scheme of the present invention will be further described in detail in combination with the accompanying drawings and specific examples below.

Figure 1:
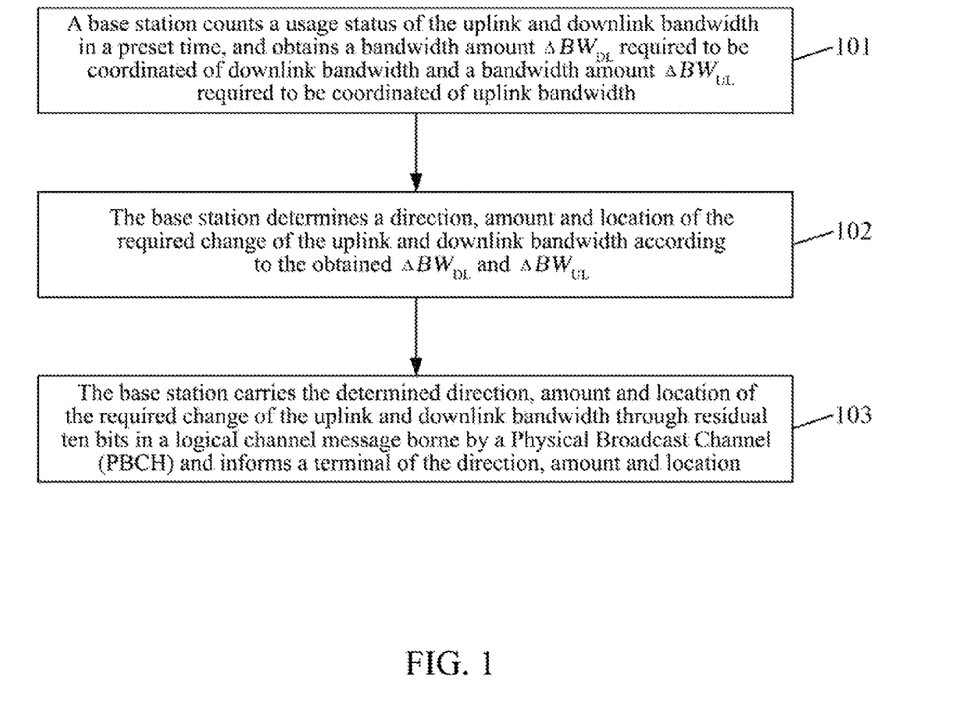
FIG. 1 is a flow diagram of the method for adaptively adjusting uplink and downlink bandwidth according to the present invention.

In order to solve dynamic coordination and allocation of the uplink and downlink bandwidth in an LTE FDD system and improve utilization efficiency of frequency spectrum, the present invention provides a method for adaptively adjusting uplink and downlink bandwidth, and as shown in FIG. 1, following steps are mainly included.

In step 101, a base station counts a usage status of the uplink and downlink bandwidth in a preset time, and obtains a bandwidth amount $\Delta BW_{DL}$ required to be coordinated of downlink bandwidth and a bandwidth amount $\Delta BW_{UL}$ required to be coordinated of uplink bandwidth.

Specifically, the bandwidth amount $\Delta BW_{DL}$ required to be coordinated of downlink bandwidth is obtained from the counting and a Resources Block (RB) is takes as a unit; and the bandwidth amount $\Delta BW_{UL}$ required to be coordinated of uplink bandwidth is obtained from the counting and also the RB is taken as a unit. Wherein, both $\Delta BW_{DL}$ and $\Delta BW_{DL}$ are integer, when $\Delta BW_{DL}$ is greater than 0, it is indicated that the downlink bandwidth can be reduced, when $\Delta BW_{DL}$ is less man 0, it is indicated that the downlink bandwidth needs to be increased, and when $\Delta BW_{DL}$ is equal to 0, it is indicated that the downlink bandwidth does not need to be changed; similarly, when $\Delta BW_{UL}$ is greater than 0, it is indicated that the uplink bandwidth can be reduced, when $\Delta BW_{UL}$ is less than 0, it is indicated that the uplink bandwidth needs to be increased, and when $\Delta BW_{UL}$ is equal to 0, it is indicated that the uplink bandwidth does not need to be changed.

In step 102, the base station determines a direction, amount and location of the required change of the uplink and downlink bandwidth according to the obtained $\Delta BW_{DL}$ and $\Delta BW_{UL}$.

Specifically, when $\Delta BW_{DL}$ is less than 0, $\Delta BW_{UL}$ is greater than 0, an absolute value of $\Delta BW_{DL}$ is less than or equal to an absolute value of $\Delta BW_{UL}$, and the absolute value of $\Delta BW_{DL}$ is greater than or equal to a certain element in a preset RB number set, the base station selects a maximum value less than the absolute value of $\Delta BW_{DL}$ from the RB number set as coordination bandwidth to allocate to the downlink bandwidth; when $\Delta BW_{UL}$ is less than 0, $\Delta BW_{DL}$ is greater than 0, the absolute value of $\Delta BW_{UL}$ is less than or equal to the absolute value of $\Delta BW_{DL}$ is and the absolute value of $\Delta BW_{UL}$ is greater than or equal to a certain element in the preset RB number set, the base station selects the maximum value less than the absolute value of $\Delta BW_{UL}$ from the RB number set as the coordination bandwidth to allocate to the uplink bandwidth.

Wherein, in the condition that $\Delta BW_{DL}$ is less than 0 and $\Delta BW_{UL}$ is greater than 0, the absolute value of $\Delta BW_{DL}$ is less than or equal to the absolute value of $\Delta BW_{UL}$, it is indicated that the bandwidth amount which can be reduced in uplink is greater than or equal to the bandwidth amount which needs to be increased in downlink, that is, the spare bandwidth amount in uplink can satisfy the increase demand of the downlink bandwidth; in the condition that $\Delta BW_{UL}$ is less than 0, $\Delta BW_{DL}$ is greater than 0, the absolute value of $\Delta BW_{DL}$ is less than or equal to the absolute value of $\Delta BW_{DL}$, it is indicated that the bandwidth amount which can be reduced in downlink is greater than or equal to the bandwidth amount which needs to be increased in uplink, that is, the spare bandwidth amount in downlink can satisfy the increase demand of the uplink bandwidth.

In step 103, the base station carries the determined direction, amount and location of the required change of the uplink and downlink bandwidth through residual ten bits in a logical channel message borne by a Physical Broadcast Channel (PBCH) and informs a terminal of the direction, amount and location. Other message formats in the logical channel message are not changed.

Identity information indicating that the coordination bandwidth is downlink borrowing or uplink borrowing, amount of borrowing bandwidth and location of borrowing bandwidth can be carried in the residual ten bits in the logical channel message borne by the PBCH. In addition, in the condition that the location of borrowing bandwidth is pre-configured (that is, predetermined by the base station and terminal), only the identity information indicating that the coordination bandwidth is downlink borrowing or uplink borrowing and the amount of borrowing bandwidth can be carried in the residual ten bits in the logical channel message borne by the PBCH.

After the base station sends the logical channel message corresponding to the PBCH to the terminal, the terminal obtains the direction, amount and location of the required change of the uplink and downlink bandwidth by parsing the logical channel message, and re-coordinates the uplink and downlink bandwidth based on this. The coordinated number of RBs is updated to the uplink and downlink bandwidth, so as to guarantee the uplink and downlink bandwidth of the base station and terminal are coordinated and consonant.

The above method for adaptively adjusting the uplink and downlink bandwidth will be further described in detail in combination with the specific examples below.

Example one of the present invention mainly includes following operations.

In step 201, a base station counts a usage status of downlink bandwidth, determines that $\Delta BW_{DL}$ is also required to be coordinated, where the $\Delta BW_{DL}$ is assumed to be less than 0; counts a usage status of uplink bandwidth, determines that $\Delta BW_{UL}$ is also required to be coordinated, where the $\Delta BW_{UL}$ is assumed to be greater than 0.

Figure 2:
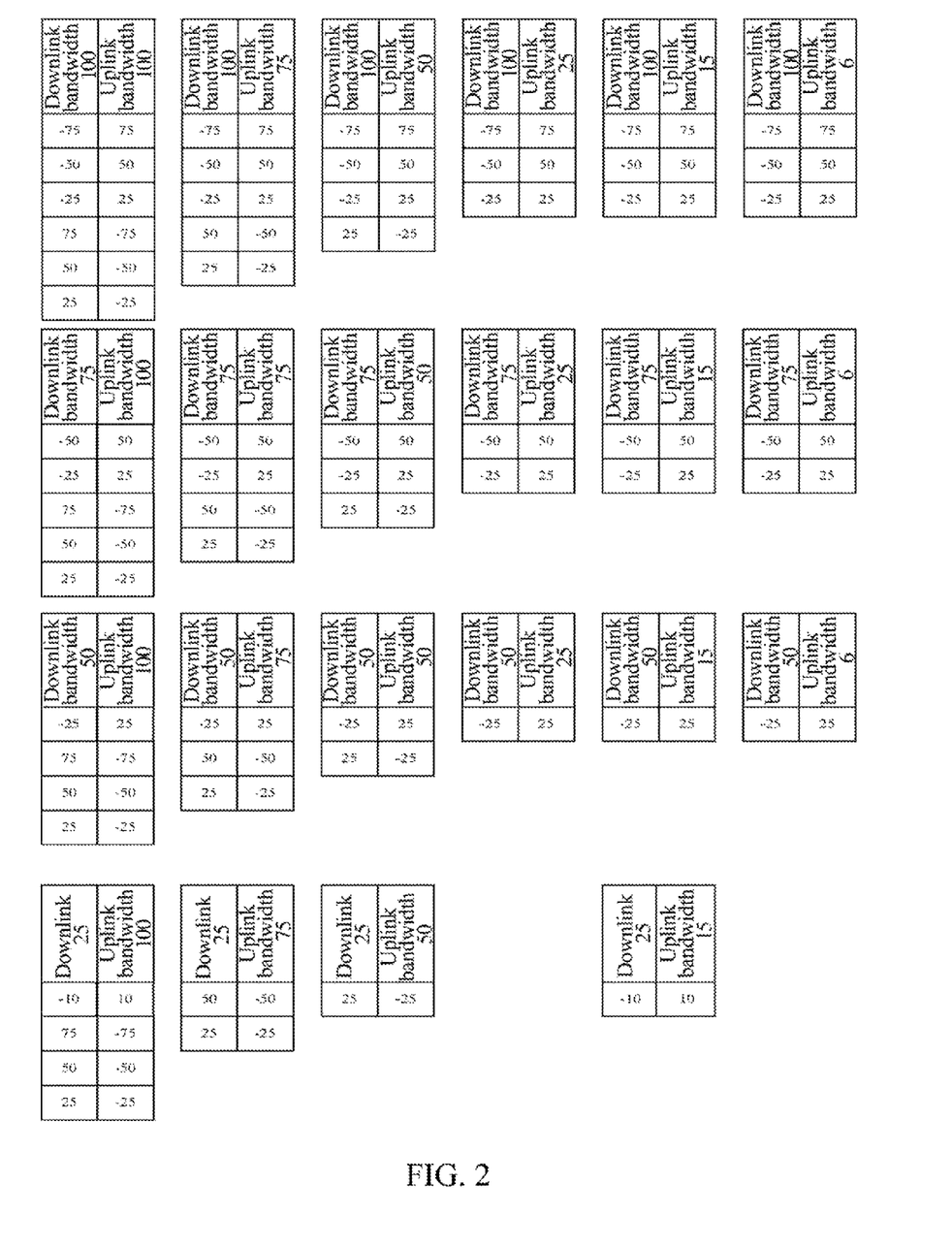
FIG. 2 is a schematic diagram of RB number sets in the example of the present invention.

In step 202, according to a high layer information element, namely, dl-Bandwidth and ul-Bandwidth, which are an uplink default bandwidth configuration and a downlink default bandwidth configuration, the base station selects an RB number set which can be coordinated from RB number sets shown in FIG. 2.

For example, when the downlink default bandwidth configuration (i.e. dl-Bandwidth) is 100 RBs, and the uplink default bandwidth configuration (i.e. ul-Bandwidth) is also 100 RBs, the first set on the first horizontal row in FIG. 2 is selected as the RB number set which can be coordinated; similarly, when the dl-Bandwidth is 75 RBs, and the ul-Bandwidth is 50 RBs, the third set on the second horizontal row in FIG. 2 is selected as the RB number set which can be coordinated.

Figure 3:
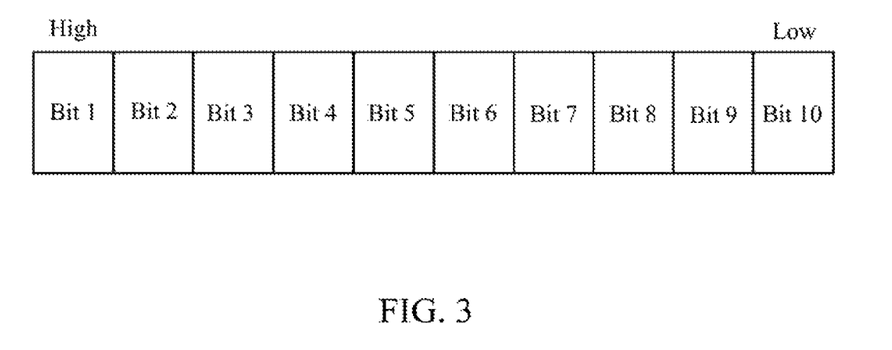
FIG. 3 is a schematic diagram of residual ten bits in a logical channel message corresponding to a PBCH in the example of the present invention.

In step 203, bit 1 in FIG. 3 is used to identify that coordination bandwidth is downlink borrowing or uplink borrowing, for example, a value 0 indicates that the bandwidth is borrowed by the downlink (that is, the bandwidth is borrowed from the uplink), and a value 1 indicates that the bandwidth is borrowed by the uplink (that is, the bandwidth is borrowed from the downlink); bit 2 and bit 3 in FIG. 3 are used to describe the amount of borrowed bandwidth; bit 4 to bit 10 are used to describe the location of borrowed bandwidth.

Figure 4:
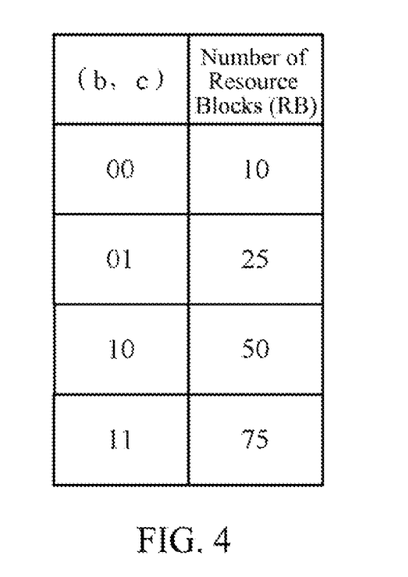
FIG. 4 is a schematic diagram of two bits describing the amount of borrowing bandwidth in the example of the present invention.

Wherein, the bit 2 and bit 3 are used to describe the amount of borrowed bandwidth, which may be referred to FIG. 4. When the value of these two bits is 00, it represents that the corresponding amount of borrowed bandwidth is 10; when the value of these two bits is 01, it represents that the corresponding amount of borrowed bandwidth is 25; when the value of these two bits is 10, it represents that the corresponding amount of borrowed bandwidth is 50; and when the value of these two bits is 11, it represents that the corresponding amount of borrowed bandwidth is 75. Certainly, a corresponding relation between these two bits and the number of RBs also can have other settings according to the actual need.

In step 204, if an absolute value of $\Delta BW_{DL}$ is less than or equal to an absolute value of $\Delta BW_{UL}$, and the absolute value of $\Delta BW_{DL}$ is greater than or equal to a certain element in a preset RB number set, a maximum value less than the absolute value of $\Delta BW_{DL}$ is selected from the RB number set which can be coordinated as the coordination bandwidth to allocate to the downlink bandwidth.

For example, the first set on the first horizontal row in FIG. 2 is selected as the RB number set which can be coordinated in step 202, and if the absolute value of $\Delta BW_{DL}$ is 0, the absolute value of $\Delta BW_{DL}$ is greater than 25 (which is the maximum value less than 30 in the RB number set) in the selected RB number set, thereby selecting 25 RBs as the coordination bandwidth to allocate to the downlink bandwidth.

In step 205, the base station configures a domain of the coordinated RBs in a logical channel message corresponding to a PBCH. The domain contains the number of coordinated RBs.

In step 206, a terminal parses the logical channel message to obtain the dl-Bandwidth, parses a System Information Block2 (SIB2) in the message to obtain the ul-Bandwidth, and parses the domain coordinating the RBs to obtain the coordinated number of RBs.

In step 207, the terminal adds the number of coordinated RBs to the dl-Bandwidth to obtain the coordinated downlink bandwidth, and subtracts the number of coordinated RBs from the ul-Bandwidth to obtain the coordinated uplink bandwidth.

Example two of the present invention mainly includes following operations.

In step 301, a base station counts a usage status of downlink bandwidth, determines that $\Delta BW_{DL}$ is still required to be coordinated, where that $\Delta BW_{DL}$ is assumed to be greater than 0; counts a usage status of uplink bandwidth, determines that $\Delta BW_{DL}$ is also required to be coordinated, where that $\Delta BW_{UL}$ is assumed to be less than 0.

In step 302, according to dl-Bandwidth and ul-Bandwidth, and in accordance with instructions of FIG. 1, the base station determines an RB number set which can be coordinated.

In step 303, bit 10 in FIG. 3 is used to identify that coordination bandwidth is downlink borrowing or uplink borrowing, for example, a value 0 indicates that the bandwidth is borrowed by the downlink (that is, the bandwidth is borrowed from the uplink), and a value 1 indicates that the bandwidth is borrowed by the uplink (that is, the bandwidth is borrowed from the downlink); bit 8 and bit 9 in FIG. 3 are used to describe the amount of borrowed bandwidth; bit 1 to bit 7 in FIG. 3 are used to describe the location of borrowed bandwidth.

It can be seen that a function definition of each bit in the example is different from the example one, and it should be noted that the function definition of each bit in the specific executing process can be set as needed, which is not just limited to the examples given in the present invention. In addition, a corresponding relation between the two bits used to describe the amount of borrowed bandwidth and the number of RBs also can have various settings according to the actual need.

In step 304, if an absolute value of $\Delta BW_{UL}$ is less than or equal to an absolute value of $\Delta BW_{DL}$, and the absolute value of $\Delta BW_{UL}$ is greater than or equal to a certain element in a preset RB number set, a maximum value less than the absolute value of $\Delta BW_{UL}$ is selected from the RB number set which can be coordinated as the coordination bandwidth to allocate to the uplink bandwidth.

For example, the second set on the first horizontal row in FIG. 2 is selected as the RB number set which can be coordinated in step 302, and if the absolute value of $\Delta BW_{UL}$ is 60, the absolute value of $\Delta BW_{UL}$ is greater than 50 (which is the maximum value less than 60 in the RB number set) in the selected RB number set, thereby selecting 50 RBs as the coordination bandwidth to allocate to the uplink bandwidth.

In step 305, the base station configures a domain of the coordinated RBs in a logical channel message corresponding to a PBCH. The domain contains the number of coordinated RBs.

In step 306, a terminal parses the logical channel message to obtain the dl-Bandwidth, parses an SIB2 in the message to obtain the ul-Bandwidth, and parses the domain of the coordinated RBs to obtain the number of coordinated RBs.

In step 307, the terminal adds the number of coordinated RBs to the ul-Bandwidth to obtain the coordinated uplink bandwidth, and subtracts the number of coordinated RBs from the dl-Bandwidth to obtain the coordinated downlink bandwidth.

Example three of the present invention mainly includes following operations.

In step 401, a base station counts a usage status of downlink bandwidth, determines that $\Delta BW_{DL}$ is also required to be coordinated, where that $\Delta BW_{DL}$ is assumed to be less than 0; counts a usage status of uplink bandwidth, determines that $\Delta BW_{UL}$ is also required to be coordinated, where that $\Delta BW_{UL}$ is assumed to be greater than 0.

In step 402, according to dl-Bandwidth and ul-Bandwidth, and in accordance with instructions of FIG. 1, the base station determines an RB number set which can be coordinated.

In step 403, bit 1 in FIG. 3 is used to identify that coordination bandwidth is downlink borrowing or uplink borrowing, bit 2 and bit 3 in FIG. 3 are used to describe the amount of borrowed bandwidth; and the location of borrowed RB is pre-configured.

In step 404, if an absolute value of $\Delta BW_{DL}$ is less than or equal to an absolute value of $\Delta BW_{UL}$, and the absolute value of $\Delta BW_{DL}$ is greater than or equal to a certain element in a preset RB number set, a maximum value less than the absolute value of $\Delta BW_{DL}$ is selected from the RB number set which can be coordinated as the coordination bandwidth to allocate to the downlink bandwidth.

In step 405, the base station configures a domain of the coordinated RBs in a logical channel message corresponding to a PBCH. The domain contains the number of coordinated RBs.

In step 406, a terminal parses the logical channel message to obtain the dl-Bandwidth, parses an SIB2 in the message to obtain the ul-Bandwidth, and parses the domain of the coordinating RBs to obtain the number of coordinated RBs.

In step 407, the terminal adds the number of coordinated RBs to the dl-Bandwidth to obtain the coordinated downlink bandwidth, and subtracts the number of coordinated RBs from the ul-Bandwidth to obtain the coordinated uplink bandwidth.

Example four of the present invention mainly includes following operations.

In step 501, a base station counts a usage status of downlink bandwidth, determines that $\Delta BW_{DL}$ is also required to be coordinated, where that $\Delta BW_{DL}$ is assumed to be less than 0; counts a usage status of uplink bandwidth, determines that $\Delta BW_{UL}$ is also required to be coordinated, where that $\Delta BW_{UL}$ is assumed to be greater than 0.

In step 502, according to dl-Bandwidth and ul-Bandwidth, and in accordance with instructions of FIG. 1, the base station determines an RB number set which can be coordinated.

In step 503, bit 10 in FIG. 3 is used to identify that coordination bandwidth is downlink borrowing or uplink borrowing, bit 8 and bit 9 in FIG. 3 are used to describe the amount of borrowed bandwidth; and the location of borrowed RB is pre-configured.

In step 504, if an absolute value of $\Delta BW_{UL}$ is less than or equal to an absolute value of $\Delta BW_{DL}$, and the absolute value of $\Delta BW_{UL}$ is greater than or equal to a certain element in a preset RB number set, a maximum value less than the absolute value of $\Delta BW_{UL}$ is selected from the RB number set which can be coordinated as the coordination bandwidth to allocate to the downlink bandwidth.

In step 505, the base station configures a domain of the coordinated RBs in a logical channel message corresponding to a PBCH. The domain contains the number of coordinated RBs.

In step 506, a terminal parses the logical channel message to obtain the dl-Bandwidth, parses an SIB2 in the message to obtain the ul-Bandwidth, and parses the domain of the coordinated RBs to obtain the number of coordinated RBs.

In step 507, the terminal adds the number of coordinated RBs to the ul-Bandwidth to obtain the coordinated uplink bandwidth, and subtracts the number of coordinated RBs from the dl-Bandwidth to obtain the coordinated downlink bandwidth.

Figure 5:
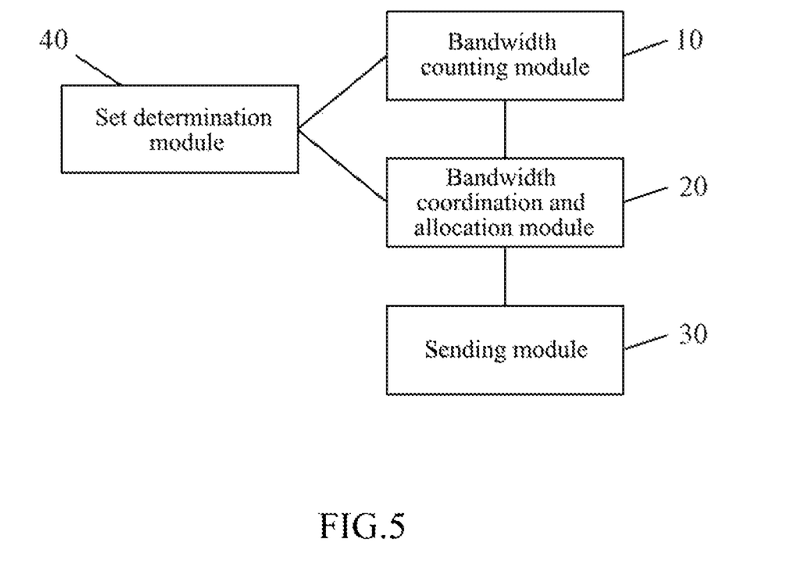
FIG. 5 is a structure diagram of the device for adaptively adjusting uplink and downlink bandwidth according to the present invention.

Corresponding to the above method for adaptively adjusting the uplink and downlink bandwidth, the present invention also provides a device for adaptively adjusting the uplink and downlink bandwidth. The device is applied in a base station and includes: a bandwidth counting module 10, a bandwidth coordination and allocation module 20 and a sending module 30. Wherein, the bandwidth counting module 10 is configured to: count a usage status of the uplink and downlink bandwidth in a preset time, and obtain a bandwidth amount $\Delta BW_{DL}$ required to be coordinated of downlink bandwidth and a bandwidth amount $\Delta BW_{UL}$ required to be coordinated of uplink bandwidth. The bandwidth coordination and allocation module 20 is configured to: determine a direction, amount and location of the required change of the uplink and downlink bandwidth according to the obtained $\Delta BW_{DL}$ and $\Delta BW_{UL}$. Specifically, when $\Delta BW_{DL}$ is less than 0, $\Delta BW_{UL}$ is greater than 0, an absolute value of $\Delta BW_{DL}$ is less than or equal to an absolute value of $\Delta BW_{UL}$, and the absolute value of $\Delta BW_{DL}$ is greater than or equal to a certain element in a preset RB number set, select a maximum value less than the absolute value of $\Delta BW_{DL}$ from the RB number set as coordination bandwidth to allocate to the downlink bandwidth; when $\Delta BW_{UL}$ is less than 0, $\Delta BW_{DL}$ is greater than 0, the absolute value of $\Delta BW_{UL}$ is less than or equal to the absolute value of $\Delta BW_{DL}$ and the absolute value of $\Delta BW_{UL}$ is greater than or equal to a certain element in the preset RB number set, select the maximum value less than the absolute value of $\Delta BW_{UL}$ from the RB number set as the coordination bandwidth to allocate to the uplink bandwidth. The sending module 30 is configured to: carry the determined direction, amount and location of the required change of the uplink and downlink bandwidth through residual ten bits in a logical channel message corresponding to a PBCH and inform a terminal of the direction, amount and location.

Preferably, the device further includes: a set determination module 40, configured to: after the usage status of the uplink and downlink bandwidth in the preset time is counted, determine the preset RB number set according to an uplink default bandwidth configuration and a downlink default bandwidth configuration.

In addition, after receiving the logical channel message, the terminal obtains the direction, amount and location of the required change of the uplink and downlink bandwidth by parsing the logical channel message, and re-coordinates the uplink and downlink bandwidth based on this.

In conclusion, with the present invention, dynamic coordination and allocation of the uplink and downlink bandwidth in the LTE FDD system is solved, and utilization efficiency of frequency spectrum is improved. The implementation complexity of the present invention is lower, modification to the base station and terminal is smaller relative to cognitive radio technology, and a network structure will not be modified; LTE Release8 users can have better compatibility through the RRC layer configuration; and the MAC layer scheduling can avoid the interference between the uplink and downlink.

The above description is only the preferred examples of the present invention, which is not used to limit the protection scope of the present invention.

What is claimed is:

1. A method for adaptively adjusting uplink and downlink bandwidth, comprising:
   a base station counting a usage status of the uplink and downlink bandwidth in a preset time, and obtaining a bandwidth amount $\Delta BW_{DL}$ required to be coordinated of downlink bandwidth and a bandwidth amount $\Delta BW_{UL}$ required to be coordinated of uplink bandwidth;
   the base station determining a direction, amount and location of the required change of the uplink and downlink bandwidth according to the obtained $\Delta BW_{DL}$ and $\Delta BW_{UL}$ in following ways:
   when $\Delta BW^{DL}$ is less than 0, $\Delta BW_{UL}$ is greater than 0, an absolute value of $\Delta BW_{DL}$ is less than or equal to an absolute value of $\Delta BW_{UL}$, and the absolute value of $\Delta BW_{DL}$ is greater than or equal to a certain element in a preset RB number set, the base station selecting a maximum value less than the absolute value of $\Delta B_{DL}$ from the RB number set as coordination bandwidth to allocate to the downlink bandwidth;
   when $\Delta BW_{UL}$ is less than 0, $\Delta BW_{DL}$ is greater than 0, the absolute value of $\Delta BW_{UL}$ is less than or equal to the absolute value of $\Delta BW_{UL}$, and the absolute value of $\Delta BW_{DL}$, and the absolute value of $\Delta BW_{UL}$ is greater than or equal to a certain element in the preset RB number set, the base station selecting the maximum value less than the absolute value of $\Delta BW_{UL}$ from the RB number set as the coordination bandwidth to allocate to the uplink bandwidth;
   the base station carrying the determined direction, amount and location of the required change of the uplink and downlink bandwidth through residual ten bits in a logical channel message corresponding to a Physical Broadcast Channel (PBCH) and informing a terminal of the direction, amount and location.

2. The method for adaptively adjusting uplink and downlink bandwidth according to claim 1, after the base station counting the usage status of the uplink and downlink bandwidth in the preset time, further comprising: the base station determining the preset RB number set according to an uplink default bandwidth configuration and a downlink default bandwidth configuration.

3. The method for adaptively adjusting uplink and downlink bandwidth according to claim 2, further comprising:
   carrying identity information indicating that the coordination bandwidth is downlink borrowing or uplink borrowing, amount of borrowing bandwidth and location of borrowing bandwidth in the residual ten bits in the logical channel message corresponding to the PBCH;
   or, carrying the identity information indicating that the coordination bandwidth is downlink borrowing or uplink borrowing and the amount of borrowing bandwidth in the residual ten bits in the logical channel message corresponding to the PBCH; wherein, the location of borrowing bandwidth is pre-configured.

4. The method for adaptively adjusting uplink and downlink bandwidth according to claim 2, after the base station sends the logical channel message corresponding to the PBCH to the terminal, further comprising:
   the terminal obtaining the direction, amount and location of the required change of the uplink and downlink bandwidth by parsing the logical channel message, and re-coordinating the uplink and downlink bandwidth based on this.

5. The method for adaptively adjusting uplink and downlink bandwidth according to claim 1, further comprising:
   carrying identity information indicating that the coordination bandwidth is downlink borrowing or uplink borrowing, amount of borrowing bandwidth and location of borrowing bandwidth in the residual ten bits in the logical channel message corresponding to the PBCH;
   or, carrying the identity information indicating that the coordination bandwidth is downlink borrowing or uplink borrowing and the amount of borrowing bandwidth in the residual ten bits in the logical channel message corresponding to the PBCH; wherein, the location of borrowing bandwidth is pre-configured.

6. The method for adaptively adjusting uplink and downlink bandwidth according to claim 1, after the base station sends the logical channel message corresponding to the PBCH to the terminal, further comprising:
   the terminal obtaining the direction, amount and location of the required change of the uplink and downlink bandwidth by parsing the logical channel message, and re-coordinating the uplink and downlink bandwidth based on this.

7. The method for adaptively adjusting uplink and downlink bandwidth according to claim 1, after the base station sends the logical channel message corresponding to the PBCH to the terminal, further comprising:
   the terminal obtaining the direction, amount and location of the required change of the uplink and downlink bandwidth by parsing the logical channel message, and re-coordinating the uplink and downlink bandwidth based on this.

8. A device for adaptively adjusting uplink and downlink bandwidth, comprising:
a bandwidth counting module, configured to: count a usage status of the uplink and downlink bandwidth in a preset time, and obtain a bandwidth amount $\Delta BW_{DL}$ required to be coordinated of downlink bandwidth and a bandwidth amount $\Delta BW_{UL}$ required to be coordinated of uplink bandwidth;
a bandwidth coordination and allocation module, configured to: determine a direction, amount and location of the required change of the uplink and downlink bandwidth according to the obtained $\Delta BW_{DL}$ and $\Delta BW_{UL}$ in following ways:
when $\Delta BW_{DL}$ is less than 0, $\Delta BW_{UL}$ is greater than 0, an absolute value of $\Delta BW_{DL}$ is less than or equal to the absolute value of $\Delta BW_{UL}$, and the absolute value of $\Delta BW_{DL}$ is greater than or equal to a certain element in the present RB number set, select the maximum value less than the absolute value of $\Delta BW_{DL}$ from the RB number set as coordination bandwidth to allocate to the downlink bandwidth;
when $\Delta BW_{UL}$ is less then 0, $\Delta BW_{DL}$, is greater than 0, the absolute value of $\Delta BW_{UL}$ is less than or equal to the absolute value of $\Delta BW_{DL}$, and the absolute value of $\Delta BW_{UL}$ is greater than or equal to a certain element in preset RB number set, select the maximum value less than the absolute value of $\Delta BW_{UL}$ from the RB number set as the coordination bandwidth to allocate the uplink bandwidth;
a sending module, configured to: carry the determined direction, amount and location of the required change of the uplink and downlink bandwidth through residual ten bits in a logical channel message corresponding to a PBCH and inform a terminal of the direction, amount and location.

9. The device for adaptively adjusting uplink and downlink bandwidth according to claim 8, further comprising: a set determination module, configured to: after the usage status of the uplink and downlink bandwidth in the preset time is counted, determine the preset RB number set according to an uplink default bandwidth configuration and a downlink default bandwidth configuration.

10. The device for adaptively adjusting uplink and downlink bandwidth according to claim 9, wherein, identity information indicating that the coordination bandwidth is downlink borrowing or uplink borrowing, amount of borrowing bandwidth and location of borrowing bandwidth are carried in the residual ten bits in the logical channel message corresponding to the PBCH;
or, the identity information indicating that the coordination bandwidth is downlink borrowing or uplink borrowing and the amount of borrowing bandwidth are carried in the residual ten bits in the logical channel message corresponding to the PBCH; and the location of borrowing bandwidth is pre-configured.

11. The device for adaptively adjusting uplink and downlink bandwidth according to claim 9, wherein, after receiving the logical channel message, the terminal obtains the direction, amount and location of the required change of the uplink and downlink bandwidth by parsing the logical channel message, and re-coordinates the uplink and downlink bandwidth based on this.

12. The device for adaptively adjusting uplink and downlink bandwidth according to claim 8, wherein, identity information indicating that the coordination bandwidth is downlink borrowing or uplink borrowing, amount of borrowing bandwidth and location of borrowing bandwidth are carried in the residual ten bits in the logical channel message corresponding to the PBCH;
or, the identity information indicating that the coordination bandwidth is downlink borrowing or uplink borrowing and the amount of borrowing bandwidth are carried in the residual ten bits in the logical channel message corresponding to the PBCH; and the location of borrowing bandwidth is pre-configured.

13. The device for adaptively adjusting uplink and downlink bandwidth according to claim 8, wherein, after receiving the logical channel message, the terminal obtains the direction, amount and location of the required change of the uplink and downlink bandwidth by parsing the logical channel message, and re-coordinates the uplink and downlink bandwidth based on this.

14. The device for adaptively adjusting uplink and downlink bandwidth according to claim 8, wherein, after receiving the logical channel message, the terminal obtains the direction, amount and location of the required change of the uplink and downlink bandwidth by parsing the logical channel message, and re-coordinates the uplink and downlink bandwidth based on this.

* * * * *